July 15, 1924.  1,501,667

K. S. JOHNSON

ELECTRICAL NETWORK

Filed May 11, 1921   2 Sheets-Sheet 1

Inventor:
Kenneth S. Johnson.
by W. E. Beatty Att'y.

July 15, 1924.
K. S. JOHNSON
ELECTRICAL NETWORK
Filed May 11, 1921
1,501,667
2 Sheets-Sheet 2
Fig. 19
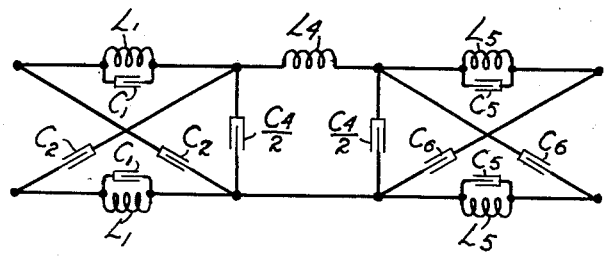
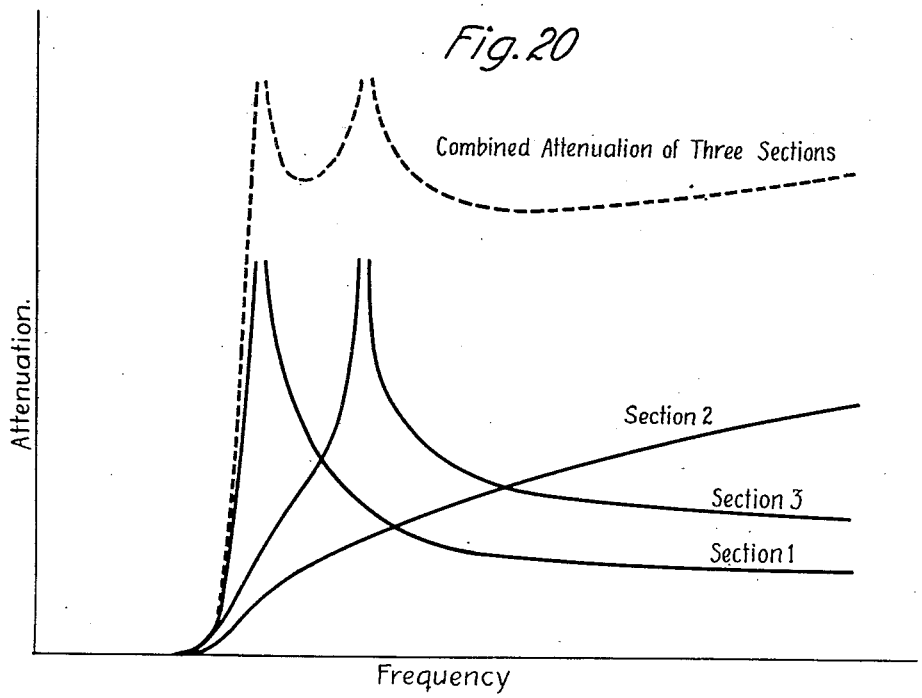
Fig. 20
Inventor:
Kenneth S. Johnson
by ~~~~~ Atty Patented July 15, 1924.

1,501,667

UNITED STATES PATENT OFFICE.

KENNETH S. JOHNSON, OF JERSEY CITY, NEW JERSEY, ASSIGNOR TO WESTERN ELECTRIC COMPANY, INCORPORATED, OF NEW YORK, N. Y., A CORPORATION OF NEW YORK.

ELECTRICAL NETWORK.

Application filed May 11, 1921. Serial No. 468,710.

*To all whom it may concern:*

Be it known that I, KENNETH S. JOHNSON, a citizen of the United States, residing at Jersey City, in the county of Hudson, State of New Jersey, have invented certain new and useful Improvements in Electrical Networks, of which the following is a full, clear, concise, and exact description.

This invention relates to electrical circuits for the transmission of alternating currents and more particularly to wave filters designed to permit the transmission of certain frequencies and suppress other frequencies.

It has been found that a network in the form of a Wheatstone bridge, having certain impedances in its arms and having the incoming and outgoing lines connected respectively across its pairs of diagonal terminals, forms a balanced filter section. Filters having bridge type sections may be made to have the electrical characteristics of the filters shown in U. S. patent to Campbell, 1,227,113, dated May 22, 1917, and in the application of G. A. Campbell, Serial No. 239,576, filed June 14, 1918, as well as other similar filters not shown by Campbell.

A great number of combinations of inductances and capacities are possible in a bridge network having filter properties. A few of these are shown herein, and design formulæ are developed for some of them. General formulæ are given from which specific formulæ not given herein, may be derived by obvious processes, and general rules are given to enable one to determine what conditions are necessary in order that a given network may have filter properties.

In the accompanying drawings, two of the bridge arms are crossed in order that the incoming and outgoing line terminals may appear at the respective sides of each figure.

Figure 17:
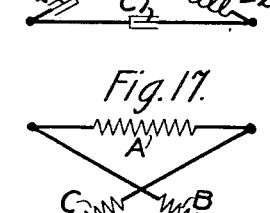
Figure 18:
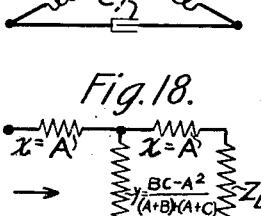

In the drawings, Figs. 1 to 6 represent respectively, filter sections in which each arm has two reactances; Figs. 7 to 16 represent sections in which two or all of the arms have each only one reactance; Fig. 17 shows diagrammatically a general case of bridge section; Fig. 18 shows a T network which is the electrical equivalent of that shown in Fig. 17; Fig. 19 is a diagrammatic illustration of a filter comprising two bridge type sections and one series shunt type section; and Fig. 20 is a graphic illustration of the attenuation characteristic of the filter shown in Fig. 19.

Fig. 17 shows a section of a general bridge type filter, in which two of the arms have equal impedances A in order that the network may be equivalent to a symmetrical T network, as will be explained below, and the other two arms have impedances B and C which may be unequal. In the following theoretical consideration it is assumed that there is no resistance in the arms. It is found in practice that this assumption is sufficiently justified for design purposes. It is found more convenient to reduce the network of Fig. 17 to the equivalent T network of Fig. 18, having equal series impedances $x$, $x$ and a shunt impedance $y$. The T network is externally equivalent to the bridge network when $$x = A \quad (1)$$

and $$y = \frac{BC - A^2}{(A+B) + (A+C)} \quad (2)$$

This is shown by setting the short-circuited and open-circuited impedances of the two circuits equal to each other. Equating the open circuited impedances of Figs. 17 and 18, $$x + y = \frac{(A+C)(A+B)}{(A+C)+(A+B)} \quad (3)$$

Equating the short-circuited impedances, $$x + \frac{xy}{x+y} = \frac{AC}{A+C} + \frac{AB}{A+B} \quad (4)$$

Solving equations (3) and (4) for $x$ and $y$, equations (1) and (2) are obtained.

In Patent No. 1,227,113, above referred to, it was shown that a network, having sections of the form of Fig. 18 herein and having negligible resistance, is a filter transmitting with negligible attenuation frequencies for which the value of the ratio of the series impedance $2^x$ (called Z, by Campbell) to the shunt impedance $y$ (called $Z_2$ by Campbell) lies between 0 and −4, and practically extinguishing all other frequencies.

$$\frac{Z_1}{Z_2} = \frac{2x}{y} = \frac{2A}{\frac{BC-A^2}{(A+B)+(A+C)}} = \frac{2A(2A+B+C)}{BC-A^2} = 0 \quad (5)$$

and, $$\frac{2A(2A+B+C)}{BC-A^2} = -4 \quad (6)$$

It has already been assumed that the series impedances A of each section are equal. Let us now consider the case where the shunt impedances B and C are equal. Assuming B=C, equations (5) and (6) may be written—

$$\frac{4A(A+B)}{B^2-A^2} = \frac{4A}{B-A} = 0 \quad (7)$$

$$\frac{A}{B-A} = -1 \quad (8)$$

By inverting both sides and simplifying, equation (7) reduces to $$\frac{B}{A} = \infty \quad (9)$$

Figure 1:
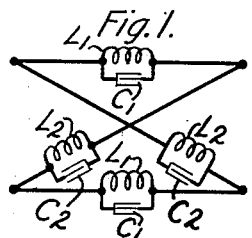
Figure 6:
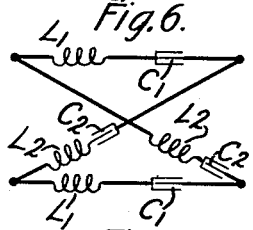

It is evident from inspection that equation (9) can be true only when A=0 and B is finite, or when B=∞ and A is finite. By inversion, equation (8) reduces to $$\frac{B}{A} = 0 \quad (10)$$

a condition which can exist only when B=0 and A is finite, or when A=∞ and B is finite. It follows that if B=C and it is desired to transmit only a band of frequencies both limits of which are other than 0 or ∞, A and B each must comprise a tuned circuit, both being series resonant or both being parallel resonant. In Figs. 1 and 6 are shown circuits in which this is possible. If, however, one of the limits of each band transmitted can be 0 or ∞, as in a high pass, low pass, or band elimination filter, it is sufficient for A or B to be a resonant circuit, Equations for these limiting values for Figs. 17 and 18 corresponding to Campbell's equations (4) may be written as follows:— or A may be series resonant and B parallel resonant or vice-versa.

Figure 15:
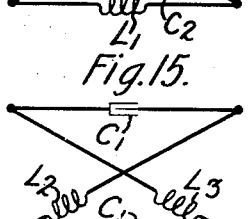

It follows also that to have filter action in a circuit having inductance only in one pair of arms, and capacity only in the other pair, as in Fig. 15, the values of the reactances in the arms of one pair must be unequal, that is, B must be unequal to C. It may be noted, however, that the circuit shown in Fig. 15, when the inductances are equal and the capacities are equal, has various desirable characteristics, some of which are described in the application of George A. Campbell, Serial No. 455,670, filed March 25, 1921.

From equations (7) and (8), it is seen that when B=C, bridge type filters pass all frequencies for which the value of $$\frac{A}{B-A}$$

lies between zero and −1. The value of this expression lies between these limits when A and B are of opposite sign. It follows that frequencies will be passed for which A and B are of opposite sign and that frequencies will be suppressed for which A and B are of the same sign.

On the other hand, by making B and C unequal, all bridge type circuits, except those having only one kind of reactance, are filters.

Letting $\theta$ represent the propagation constant of the general filter section of Fig. 17, and substituting in equation (2) of Patent No. 1,227,113, above referred to, the value of $$\frac{Z_1}{Z_2}$$

from equation (5) above, $$\theta = \cosh^{-1}\left[\frac{1}{2}\left(\frac{2A}{\frac{BC-A^2}{(A+B)+(A+C)}}\right) + 1\right] = \cosh^{-1}\left[\frac{A[(A+B)+(A+C)]}{BC-A^2} + 1\right] \quad (11)$$

For the case above referred to, where B=C, equation (11) reduces to—

$$\theta = \cosh^{-1}\left(\frac{B+A}{B-A}\right) \quad (12)$$

Assume the network of Fig. 17 or Fig. 18 to be terminated in its own iterative impedance $Z_L$ as indicated at the right in Fig. 18. Then the impedance $Z_L$ measured from the left-hand terminals is as follows:—

$$Z_L = A + \frac{(A+Z_L)\left(\frac{BC-A^2}{(A+B)+(A+C)}\right)}{A+Z_L+\frac{BC-A^2}{(A+B)+(A+C)}} \quad (13)$$

Solving for $Z_L$, $$Z_L = \sqrt{A\frac{B(A+C)+C(A+B)}{(A+B)+(A+C)}} \quad (14)$$

If $B=C$, equation (14) reduces to $$Z_L = \sqrt{AB} \quad (15)$$

Figure 8:
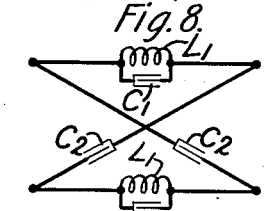

As an example of a method of deriving specific design formulæ from the general formulæ given above, let us take the filter section shown in Fig. 8, in which the impedance A comprises the inductance $L_1$ and the condenser $C_1$ in parallel, and the impedances B and C are equal, each comprising a condenser $C_2$. Representing frequency by $f$ and letting $\omega=2\pi f$, the values of A and B are:

$$A = \frac{(jL_1\omega)\left(\frac{1}{jC_1\omega}\right)}{jL_1\omega + \frac{1}{jC_1\omega}} = \frac{jL_1\omega}{1-L_1C_1\omega^2} \quad (16)$$

and $$B = \frac{1}{jC_2\omega} = \frac{-j}{C_2\omega} \quad (17)$$

Substituting these values in equation (9), $$\frac{B}{A} = \frac{-j}{C_2\omega} \div \frac{jL_1\omega}{1-L_1C_1\omega^2} = \frac{L_1C_1\omega^2-1}{L_1C_2\omega^2} = \infty \quad (18)$$

The condition represented by equation (18) is true when $$\omega = 0, \text{ or } f = 0 \quad (19)$$

Similarly, from equation (10) we have $$\frac{L_1C_1\omega^2-1}{L_1C_2\omega^2} = 0 \quad (20)$$

Solving for $\omega$, $$\omega = \frac{1}{\sqrt{L_1C_1}}, \text{ or } f_c = \frac{1}{2\pi\sqrt{L_1C_1}} \quad (21)$$

in which $f_c$ is the cut-off frequency.

It is seen from equations (19) and (21) that the network of Fig. 8 is a low pass filter, passing all frequencies from 0 to $$\frac{1}{2\pi\sqrt{L_1C_1}}$$

The iterative impedance of the filter of Fig. 8, from equations (15), (16) and (17) is $$Z_L = \sqrt{AB} = \sqrt{\frac{jL_1\omega}{1-L_1C_1\omega^2} \times \frac{-j}{C_2\omega}} = \sqrt{\frac{L_1}{(1-L_1C_1\omega^2)C_2}} \quad (22)$$

If the impedance at zero frequency be represented by $Z_0$, equation (22) becomes $$Z_0 = \sqrt{\frac{L_1}{C_2}} \quad (23)$$

In designing a low pass filter, it is usually desirable to make the value of $Z_0$ equal to the impedance of the circuit to which the filter is to be connected. There is an advantage therefore in writing the equation for the iterative impedance as follows:

$$Z_L = \frac{Z_0}{\sqrt{1-\left(\frac{f}{f_c}\right)^2}} \quad (24)$$

Equation (24) is obtained from equation (22) by substituting therein the value $$L_1C_1 = \frac{1}{4\pi^2 f_c^2}$$

from equation (21) and the value $$\frac{L_1}{C_2} = Z_0^2$$

from equation (23).

When $B=C$, as assumed in Fig. 8, equation (2) becomes $$y = \frac{B-A}{2} \quad (25)$$

When $y=0$, that is when $B=A$, no current can go through the filter section. Letting $f_\infty$ be the frequency at which this condition of maximum attenuation exists, and $\omega_\infty = 2\pi f_\infty$ and equating the values of B and A from equations (16) and (17)

$$\frac{-j}{C_2\omega_\infty} = \frac{jL_1\omega_\infty}{1-L_1C_1\omega_\infty^2} \quad (26)$$

Solving for $f_\infty$, $$\omega_\infty^2 = \frac{1}{L_1(C_1-C_2)} \quad (27)$$

$$f_\infty = \frac{1}{2\pi\sqrt{L_1(C_1-C_2)}}$$

Letting the ratio of $f\infty$ to $f_c$ be represented by $a$, we have from equations (21) and (27), $$a = \frac{f_\infty}{f_c} = \sqrt{\frac{C_1}{C_1-C_2}}$$

It will be observed that by making $C_2$ small as compared with $C_1$, the value of $a$ can be made to approach unity as closely as desired, thus giving the filter section of Fig. 8 as sharp a cut off as desired. The electrical characteristics of this form of bridge filter are the same as those of the filters shown in Figs. 9 and 10 of Campell application, Serial No. 239,576, above referred to.

By substituting the values of A and B from equations (16) and (17) in equation (12), we have, as the propagation constant of Fig. 8, $$\theta = \cosh^{-1}\left[\frac{\frac{-j}{C_2\omega}+\frac{jL_1\omega}{1-L_1C_1\omega^2}}{\frac{-j}{C_2\omega}-\frac{jL_1\omega}{1-L_1C_1\omega^2}}\right]$$

or $$\theta = \cosh^{-1}\left(\frac{1-L_1C_1\omega^2-L_1C_2\omega^2}{1-L_1C_1\omega^2+L_1C_2\omega^2}\right) \quad (29)$$

When designing a filter, the usual requirements are (1) a given impedance for a definite frequency (taken as zero frequency for a low pass filter), (2) a given cut off frequency, and (3) a given ratio $a$. From equations (21) (23) and (28) we obtain for the filter of Fig. 8, $$C_2 = \frac{\sqrt{a^2-1}}{2\pi f_c Z_0 a} \quad (30)$$

$$L_1 = Z_0^2 C_2 \quad (31)$$

$$C_1 = \frac{1}{L_1(2\pi f_c)^2} \quad (32)$$

Assume by way of illustration that it is desired to design a low pass filter to work between impedances of 600 ohms, to have a cut off frequency of 3000 cycles, and to have infinite attenuation at 3300 cycles, or 1.10 times the cut off frequency. Substituting the values $Z_0=600$, $f_c=3000$, and $a=1.10$, in equations (30) (31) and 32, we obtain directly $C_2 = .03682$ microfarads.
$L_1 = .01325$ henries.
$C_1 = .2124$ microfarads.

Figure 9:
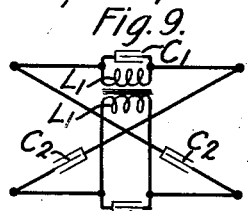

Fig. 9 differs from Fig. 8 in that the inductances $L_1$, $L_1$, are wound on the same core. The filter characteristics of the two circuits are the same. It is true in general that, where impedances in both arms of a pair of opposite arms are equal, the corresponding inductances can be wound on the same core. For example, in Figs. 1 and 3, the inductances $L_1$ can be wound on the same core and the inductances $L_2$ (assumed to be equal) can be wound on the same core.

Figure 13:
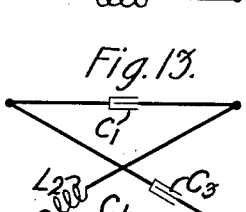

By methods similar to the above, design formulæ can be derived for each of the other forms shown. For example, Fig. 13 represents a band pass filter having cut off frequencies—

$$f_1 = \frac{1}{2\pi\sqrt{L_2(C_2+2C_1)}} \quad (33)$$

and $$f_2 = \frac{1}{2\pi}\sqrt{\frac{C_1+2C}{L_2C_1C_2}} \quad (34)$$

Fig. 15 represents a band elimination filter having cut off frequencies—

$$f_1 = \frac{1}{2\pi}\sqrt{\frac{2}{C_1(L_1+L_2)}} \quad (35)$$

and $$f_2 = \frac{1}{2\pi}\sqrt{\frac{L_1+L_2}{2C_1L_1L_2}} \quad (36)$$

In the drawings, in those forms in which B may be equal to C, the reference characters $L_2$ and $C_2$ are used to represent the reactances in both of the crossed arms. It is to be understood, however, in these cases that the reactance or reactances in one crossed arm may be different from the corresponding reactance or reactances in the other arm. In those forms in which B can not be equal to C, the reference characters $L_2$, $L_3$ and $C_2$, $C_3$ are used for the reactances in the respective crossed arms.

For reference purposes, Figs. 1 to 16 are listed below and are each classified as being a high pass, low pass, band pass, or band elimination filter. It is believed that these terms are self-defining.

Fig. 1, double band pass, becoming single band pass, when B=C.

Figure 2:
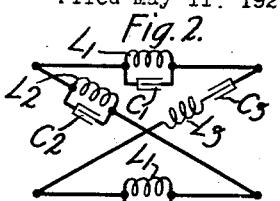

Fig. 2, double band pass, becoming single band pass, when B resonates at the same frequency as C.

Figure 3:
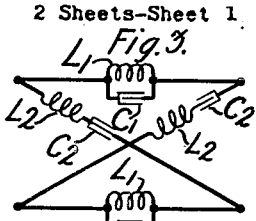

Fig. 3, double band elimination, becoming single band elimination, when B=C.

Figure 4:
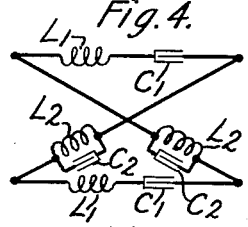

Fig. 4, double band elimination, becoming single band elimination, when B=C.

Figure 5:
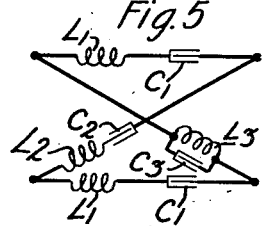

Fig. 5, double band pass, becoming single band pass, when B resonates at the same frequency as C.

Fig. 6, double band pass, becoming single band pass, when B=C.

Figure 7:
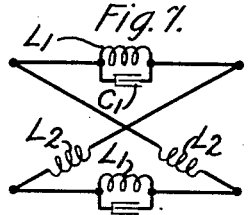

Fig. 7, double band pass, with one band extending to infinity, becoming high pass, when B=C.

Fig. 8, double band pass, with one band extending to zero, becoming low pass, when B=C.

Fig. 9, double band pass, with one band extending to zero, becoming low pass, when B=C.

Figure 10:
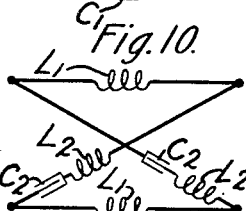

Fig. 10, double band pass, with one band extending to zero, becoming low pass, when B=C.

Figure 11:
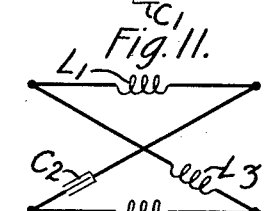

Fig. 11, band pass.

Figure 12:
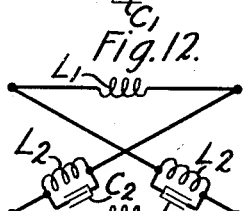

Fig. 12, double band pass, with one band extending to infinity, becoming high pass, when B=C.

Fig. 13, band pass.

Figure 14:
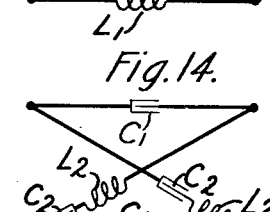

Fig. 14, double band pass, with one band extending to infinity, becoming high pass, when B=C.

Fig. 15, band elimination.

Figure 16:
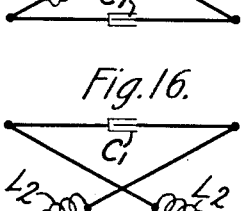

Fig. 16, double band pass, with one band extending to zero, becoming low pass, when B=C.

It will be noted that when B=C, Figs.

3, 7, and 8 are identical with Figs. 4, 12, and 16, respectively.

While each figure of the drawing shows only a single filter section, it is to be understood that the invention contemplates connecting as many sections in tandem as may be necessary to obtain the desired amount of suppression in the attenuated range. The sections may be identical, but for best results it is preferable to employ sections having the same cut off frequency or frequencies and substantially the same iterative impedance, but having different frequencies of maximum attenuation or suppression. This can easily be done with a filter having three separately variable reactances, such as in Fig. 8. From equations (21) (23) (24) and (28) it will be noted that the cut off frequency $f_c$ is a function of the product $L_1 C_1$, the iterative impedance $Z_L$ is a function of $$\frac{L_1}{C_2}$$

and frequency, and the ratio of the frequency of maximum suppression $f\infty$ to $f_0$ is a function of $$\frac{C_1}{C_1 - C_2}$$

It is possible, therefore, while keeping $f_c$ and $Z_L$ substantially constant to vary $$a = \frac{f_\infty}{f_c}$$

from a value closely approaching one to a value approaching infinity. Furthermore, good results can be obtained by combining a section corresponding to Fig. 8, with a section of the two element filter shown in Fig. 7 of Campbell Patent No. 1,227,113, in which $f_\infty$ is inherently infinity.

In Fig. 19 is shown a filter having two sections of the form shown in Fig. 8 and one section of the series shunt type shown in Campbell Patent 1,227,113, Fig. 7. Although the third section is of the same form as the first section, its constants are changed so as to give maximum attenuation at a frequency different from that of the first section. The cut-off frequency must be the same. The values of $L_1$, $C_1$ $C_2$, and $L_5$, $C_5$ and $C_6$, of the first and third sections are determined by the formulæ given above. It is apparent from the formula $I_g$ of the Campbell patent that the cut-off frequency of the second section is equal to $$\frac{1}{\pi\sqrt{L_4 C_4}}$$

By methods similar to those used above in deriving formula (24), it can readily be shown that the characteristic impedance of the second section is equal to $$\sqrt{\frac{\frac{L_4}{C_4}}{1-\left(\frac{f}{f_0}\right)^2}}$$

It will be seen therefore that a sufficient number of variables are present so that the cut-off frequency and characteristic impedance of the three sections can be made identical and that the frequency of maximum attenuation of sections 1 and 3 can be placed wherever desired. The maximum attenuation of the second section occurs at infinite frequency. The manner in which the attentuation of the three sections combines to give high attenuation throughout the range to be suppressed is illustrated in Fig. 20.

What is claimed is:

1. A wave filter comprising a section having terminals for receiving electric waves, parallel reactive paths between said terminals, output terminals on said paths at points the potentials of which are such that waves of a band of frequencies are substantially attenuated and waves of an adjacent band of frequencies are passed substantially without attenuation, said output terminals having substantially equal potentials for a frequency in the attenuated range relatively near the cut-off frequency whereby waves of said frequency are substantially wholly suppressed, and a filter section connected in tandem therewith having the same cut-off frequency but having a different frequency of maximum suppression.

2. A wave filter comprising a section in the form of a Wheatstone bridge having reactances in its arms, and having input and output terminals at its diagonal terminals, the values of said reactances being such that waves of a band of frequencies are substantially attenuated and waves of an adjacent band of frequencies are passed substantially without attenuation, and a section connected in tandem with said first section, said first and second sections having the same ranges of passed and attenuated frequencies, but having different attenuation characteristics.

3. A wave filter comprising a section having terminals for receiving electric waves, parallel reactive paths between said terminals, output terminals on said paths at points the potentials of which are such that waves of a band of frequencies are substantially attenuated and waves of an adjacent band of frequencies are passed substantially without attenuation, and a second section connected in tandem with said first section, said second section having impedances in series and in shunt respectively with reference to currents propagated through the filter, said first and second sections having the same ranges of passed and attenuated frequencies.

4. A wave filter comprising a section having terminals for receiving electric waves, parallel reactive paths between said terminals, output terminals on said paths at points the potentials of which are such that waves of a band of frequencies are substantially attenuated and waves of an adjacent band of frequencies are passed substantially without attenuation, and a section connected in tandem with said first section, said first and second sections having the same ranges of passed and attenuated frequencies and having differing attenuation characteristics.

5. A wave filter comprising a section having terminals for receiving electric waves, parallel reactive paths between said terminals, output terminals on said paths at points the potentials of which are such that waves of a band of frequencies are substantially attenuated and waves of an adjacent band of frequencies are passed substantially without attenuation, and a section connected in tandem with said first section, said first and second sections having the same ranges of passed and attenuated frequencies and the same characteristic impedances but having different attenuation characteristics.

In witness whereof, I hereunto subscribe my name this 10th day of May A. D., 1921.

KENNETH S. JOHNSON.